Figure 3:
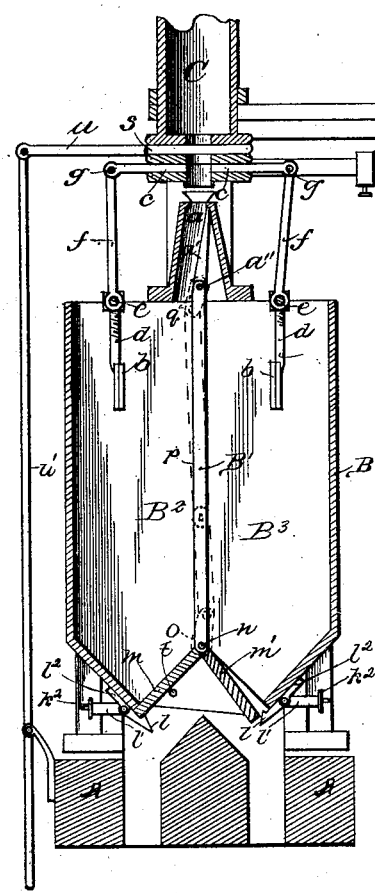

(No Model.) 2 Sheets—Sheet 1.

W. A. HOLLEY & U. MALIN.
ELECTRO MAGNETIC GRAIN WEIGHING SCALE.

No. 377,383. Patented Feb. 7, 1888.

Witnesses
H. S. Rohrer.
L. Seward Bacon.

Inventors
W. A. Holley.
Ulrik Malin.
By their Attorneys
Marble & Mason.

N. PETERS, Photo-Lithographer, Washington, D. C.

(No Model.) 2 Sheets—Sheet 2.
W. A. HOLLEY & U. MALIN.
ELECTRO MAGNETIC GRAIN WEIGHING SCALE.
No. 377,383. Patented Feb. 7, 1888.
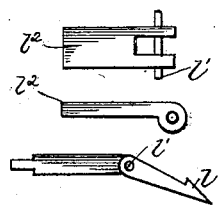
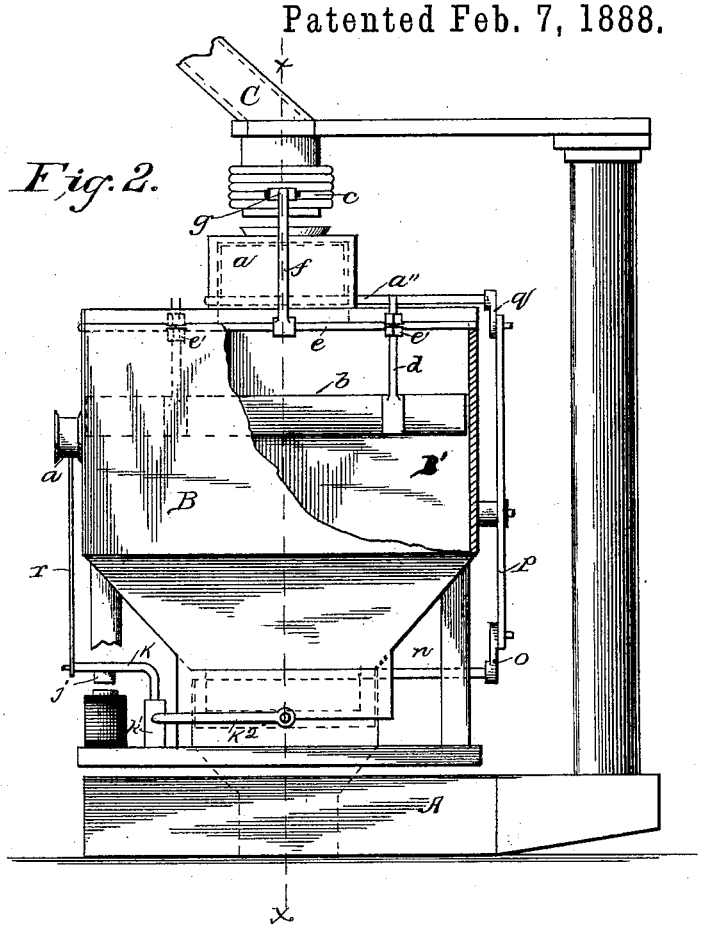
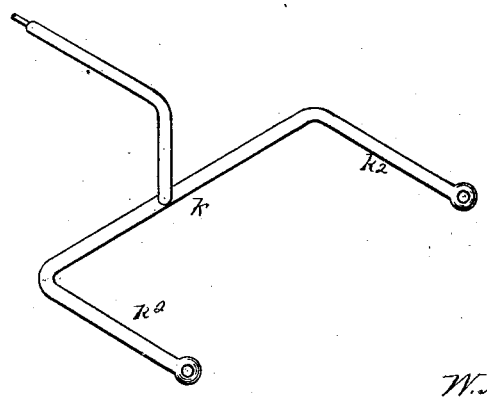
Witnesses
H. S. Rohrer
L. Seward Bacon
Inventors
W. A. Holley,
Ulrik Malin.
By their Attorneys
Marble & Mason

UNITED STATES PATENT OFFICE.

WILLIAM A. HOLLEY AND ULRIK MALIN, OF HOLLAND, MICHIGAN.

ELECTRO-MAGNETIC GRAIN-WEIGHING SCALE.

SPECIFICATION forming part of Letters Patent No. 377,383, dated February 7, 1888.

Application filed May 4, 1887. Serial No. 237,122. (No model.)

*To all whom it may concern:*

Be it known that we, WILLIAM A. HOLLEY, a citizen of the United States, residing at the city of Holland, in the county of Ottawa and State of Michigan, and ULRIK MALIN, a subject of the Czar of Russia, residing at the city of Holland, in the county of Ottawa and State of Michigan, have invented certain new and useful Improvements in Electro-Magnetic Grain-Weighing Scales, of which the following is a specification, reference being had therein to the accompanying drawings.

Our invention relates to weighing-scales, adapted more particularly for receiving, weighing, and discharging grain and like substances; and our object is to produce an improved apparatus in which all the steps necessary to cut off the supply at the proper time, weigh the grain, and discharge the same shall be performed automatically.

Generally speaking, our apparatus consists of a double hopper carried by the platform of an ordinary beam-scale, and having automatic alternately-operating supply and discharge valves. The grain is diverted from one compartment to the other at the proper time by the movement of the discharge-valves, and this movement is controlled by means of an electric circuit, itself controlled by the scale-beam.

We have shown in the drawings an open circuit closed by the scale-beam; but instead, the apparatus, as will be readily understood, can be operated through a normally-closed circuit.

For full comprehension of our invention reference is made to the drawings, in which the same reference-letters indicate the same parts, and in which—

Figure 1:
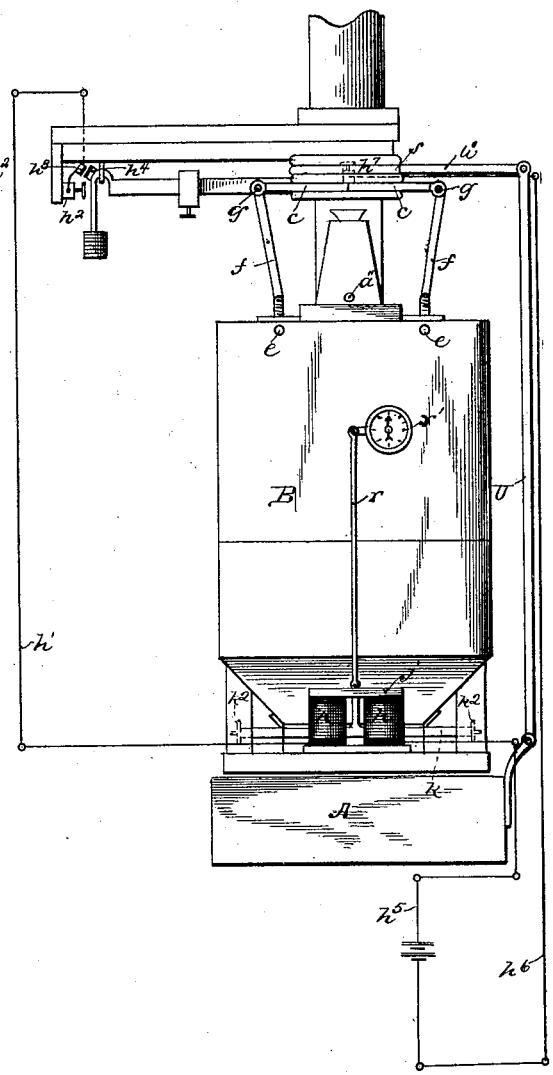

Figure 1 is a front elevation of the apparatus. Fig. 2 is a side elevation of the same with a portion of the hopper broken away to show the interior partition and also other parts. Fig. 3 is a cross-section on the line $xx$ of Fig. 2. Figs. 4 and 5 represent details of construction.

The devices for receiving and cutting off the supply of grain or other material are the subject-matter of our invention, and not the weighing devices themselves. We have therefore shown our invention in the drawings as attached to an ordinary beam-scale, and have considered it unnecessary to show more of the construction of the scale than is required to fully illustrate the operation of our invention.

The letter A in the drawings designates the scale-platform, upon which is placed the receptacle or hopper B. The hopper is divided by a longitudinal partition, B', Figs. 2 and 3, into two compartments, B² and B³, each having a contracted opening at the lower end for discharging the material. The divided hopper has an inlet chute or passage, $a$, common to both compartments, with which communicates the chute C, connected to the scale-frame in such manner as not to interfere with the operation of the weighing devices. The stream of grain is diverted from one compartment to the other by the deflector $a'$, secured to the rock-shaft $a''$ in the chute or passage $a$. This valve is operated to fill the compartments B² B³ alternately, and is connected with the double discharge-valve in the manner hereinafter to be explained.

Journaled in the ends and at the top of each of the compartments of the hopper is a rock-shaft, $e$, which extends longitudinally of the hopper. Each shaft is flattened, as shown at $e'\ e'$, Fig. 2, and is perforated at the flattened parts to receive a threaded stem, $d$, to the lower end of which the float $b$ is attached. The floats are vertically adjustable in the compartments by means of check-nuts on the stems $d\ d$, bearing against the flat surfaces $e'\ e'$ of the shafts $e\ e$, as shown in Fig. 2. Arms $f f$ are secured at the middles of the shafts $e\ e$, and these arms project up out of the hopper, and are loosely pivoted to the cut-off slides $c\ c$, which operate across the discharge-passage of the feeding-chute. When either of the compartments becomes filled, the rising grain bears upon the inner side of the float and forces it outward, thus causing a corresponding inward movement of one of the slides $c$ and a gradual diminution of the supply of grain, which continues until the supply is cut off altogether. The float should be adjusted in the hopper at such a point that the supply will be cut off at about the time when the scale-beam indicates the proper amount of grain in the hopper. The discharge of the grain from one compartment and the deflection of the supply into the other or opposite compartment of the hopper are effected through the medium of an open electric circuit, which is closed by the beam of the scale A when said beam indicates that the proper weight of grain has been received.

An electro-magnet, $h$, is placed on the platform of the scale and connected by a wire, $h'$, which passes through the scale-frame, to the binding-post $h^2$. The curved portion $h^3$ of this wire is provided with a platinum contact-surface. The electro-magnet $h$ is connected to the battery by the wire $h^5$. The scale-beam is connected with the opposite pole of the battery by the wire $h^6$, which passes from the battery to a binding-post, $h^7$, on the scale-beam directly underneath the fulcrum. The scale-beam has a platinum contact-point at $h^4$. The circuit is closed when the scale-beam rises sufficiently to bring the contact-point $h^4$ against the wire $h^3$, and the electro-magnet is thereby energized. It will be apparent that any of the ordinary contact devices for closing the circuit when the beam rises may be used. The armature $j$ is mounted upon a forked shaft, $k$, which rocks in bearings formed in standards $k'$ $k'$ on the scale-platform, and has two arms, $k^2$ $k^2$, which extend along the lower contracted sides of the hopper, as shown. Connected to each of the outer ends of the forked lever $k$, upon each side of the hopper, is a notched detent, $l$, which is pivoted by means of a pin, $l'$, to a slotted plate, $l^2$, secured to the bottom of the hopper.

The discharge-valves $m$ and $m'$ are each fixed to a rock-shaft, $n$, Figs. 2 and 3, which acts as a hinge to permit said valves to be moved simultaneously, so as to alternately open and close the discharge-openings. Each valve, when closed, is retained by the detent $l$, as best illustrated in Fig. 3. The compartment closed by the valve $m$, for instance, is permitted to fill with grain or other material until the scale-beam rises and closes the electric circuit, when the resulting movements of the armature $j$ and the forked shaft $k$ will cause the detent $l$ to release said valve $m$, which will then be fully opened by the weight of the material in the hopper. The instant the valve $m$ is opened and the material released the scale-beam will fall and the electric current be broken. As the valves $m$ and $m'$ are both fixed on the shaft $n$, the opening of the valve $m$ will close the valve $m'$, and said valve $m'$ will be held closed by its detent $l$ until the electric circuit is again made, the armature $j$ moved by the electro-magnet, and the detent released. During these movements of the valves $m$ and $m'$ the valve $a'$ at the top of the hopper will be automatically moved to divert the grain alternately into the respective compartments. This movement is effected by means of the rock-shaft $n$, which is connected at its outer end to a crank-arm, $o$, attached to a lever, $p$, which is pivoted to the outside of the hopper, as shown in Fig. 2, and by the dotted lines in Fig. 3. This lever $p$ is connected at its upper end to a similar crank-arm, $q$, attached to the rock-shaft $a''$, on which the valve $a'$ is mounted and secured. Thus it will be seen that the position of the valve $a'$ will also be shifted simultaneously with the movement of the discharge-valves.

The operation of the apparatus may be stopped completely by the devices shown in Figs. 1 and 3, which consist of a single cut-off slide, $s$, above the slides $c$, having a stem, $u$, which is operated by hand through the pivoted lever $u'$.

As shown in Figs. 1 and 2, a rod, $r$, is attached to the end of the armature-carrying lever $k$ and connected to a register, $r'$, which, by means of any of the well-known devices for this purpose, will register each discharge of the grain or other material.

To test the apparatus and see that the proper weight is obtained, the slide $c$ is closed and the discharge-valve is prevented from operating by means of a pin, $t$, Fig. 3, inserted in the wall of the hopper. This enables the operator to test the correctness of the operation of the parts.

It will be obvious from the foregoing that every step in the operation of this apparatus is automatic, and that the flow of material through the chute $a$ is continuous, it being automatically diverted to the separate compartments alternately and automatically cut off at the proper time.

Having thus fully described our invention, we claim—

1. The combination of a scale, a double hopper carried thereby, having a deflector and discharge-valves, the detents, means connecting the same, and an electric circuit constructed and arranged to be controlled by the scale-beam, whereby the discharge-valves are permitted to open by the weight of the grain, substantially as described.

2. The combination of a scale, a hopper carried thereby and provided with a connected deflector and discharge-valves, cut-off valves and floats for closing said cut-off valves, and an electric circuit constructed and arranged to be controlled by the scale-beam, whereby the discharge-valves are permitted to open, substantially as described.

3. The combination, with a scale, of a hopper carried thereby, divided into two compartments and having cut-off valves, a float in each compartment for closing said cut-off valves, a double discharge-valve and a deflector at the supply end of the hopper for diverting the material to the respective compartments alternately, and means for connecting and operating said deflector and discharge-valves simultaneously, substantially as described.

4. The combination of a scale, a hopper carried thereby and divided into two compartments, a double discharge-valve for said compartments, the detents, a supply-deflector connected to the discharge-valve, and an electric circuit controlled by the scale-beam and operating to release the detents and permit the weight of the grain to operate said dicharge-valve and deflector, substantially as described and shown.

5. The combination of a scale, a double hopper carried thereby, cut-off valves, a float in each compartment of the hopper, a double discharge-valve adapted to open and close the hopper-compartments, the detents, a deflector connected with said discharge-valve, and an electric circuit controlled by the scale-beam and operating to release the detents and permit the weight of the grain to operate said discharge-valve and deflector, substantially as described.

6. The combination of a scale, a hopper carried thereby, having a discharge-valve, a detent for retaining and releasing the discharge-valve, a battery, an electro-magnet, connections forming an electric circuit controlled by the scale-beam, and an armature for retaining and releasing the discharge-valve, substantially as described.

7. The combination, with the scale and the double hopper carried thereby and provided with the connected deflector and discharge-valves, of the forked armature-lever electrically connected to the scale, the detents, and the connecting-rod and register operated by said lever, substantially as described.

8. A scale and a double hopper having discharge-valves and detents therefor, in combination with an electric circuit controlled by the scale-beam and operating to release the detents and permit the weight of the grain to open one of said discharge-valves and close the other, substantially as described.

In testimony whereof we affix our signatures in the presence of two witnesses.

WILLIAM A. HOLLEY.
ULRIK MALIN.

Witnesses:
L. VAN PUTTEN,
A. J. GRUVER.